Jan. 21, 1969  A. A. HURSCHMAN  3,422,594
ASSEMBLY FILLING AND SEALING OF PLASTIC AMPOULES
Filed Nov. 20, 1964

INVENTOR.
ALFRED A. HURSCHMAN
ATTORNEYS

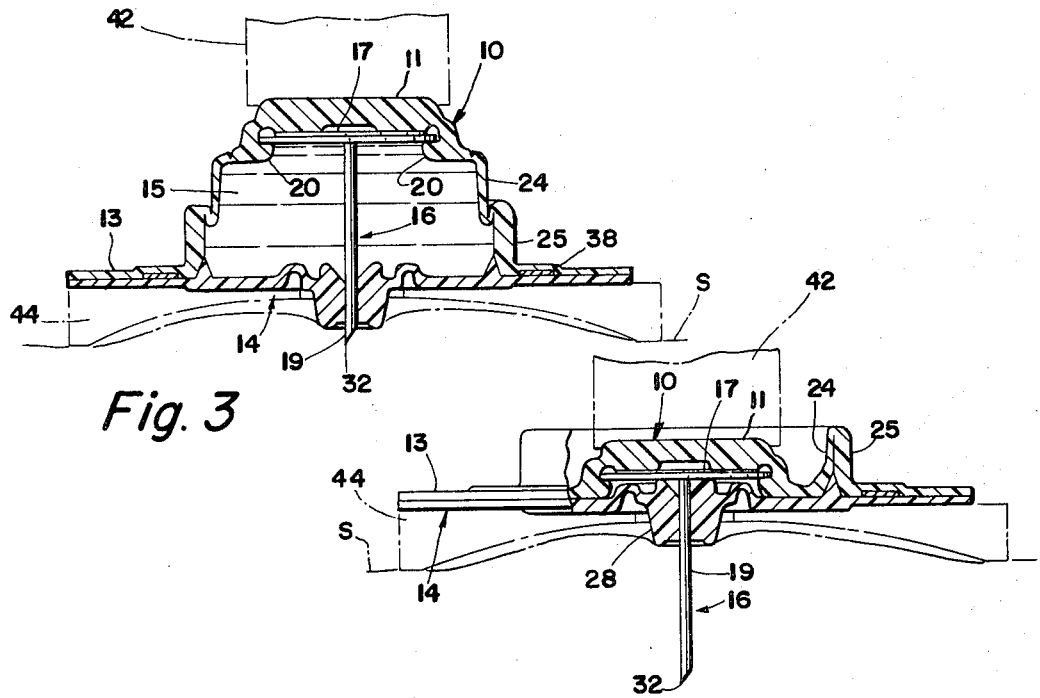
Fig. 3
Fig. 4
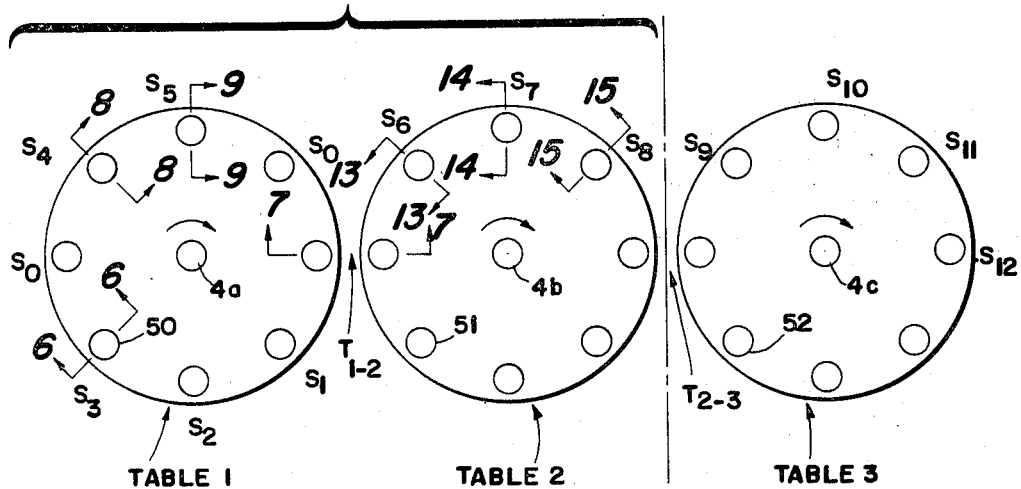
Fig. 5

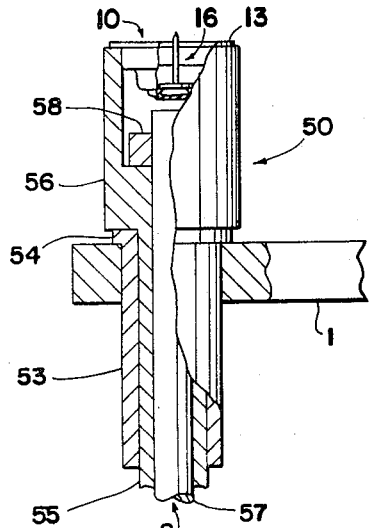
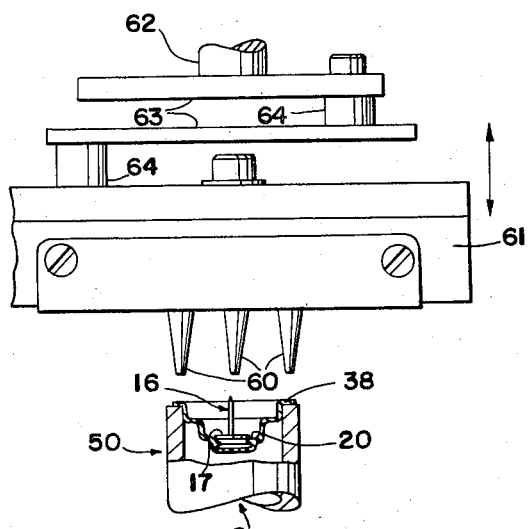
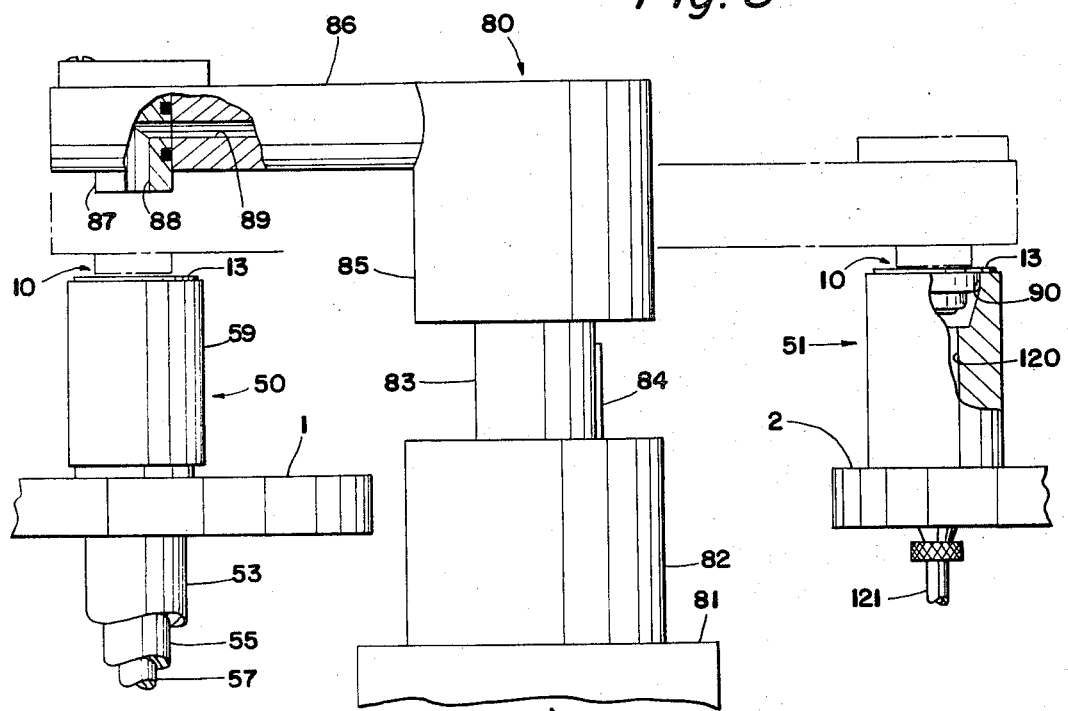

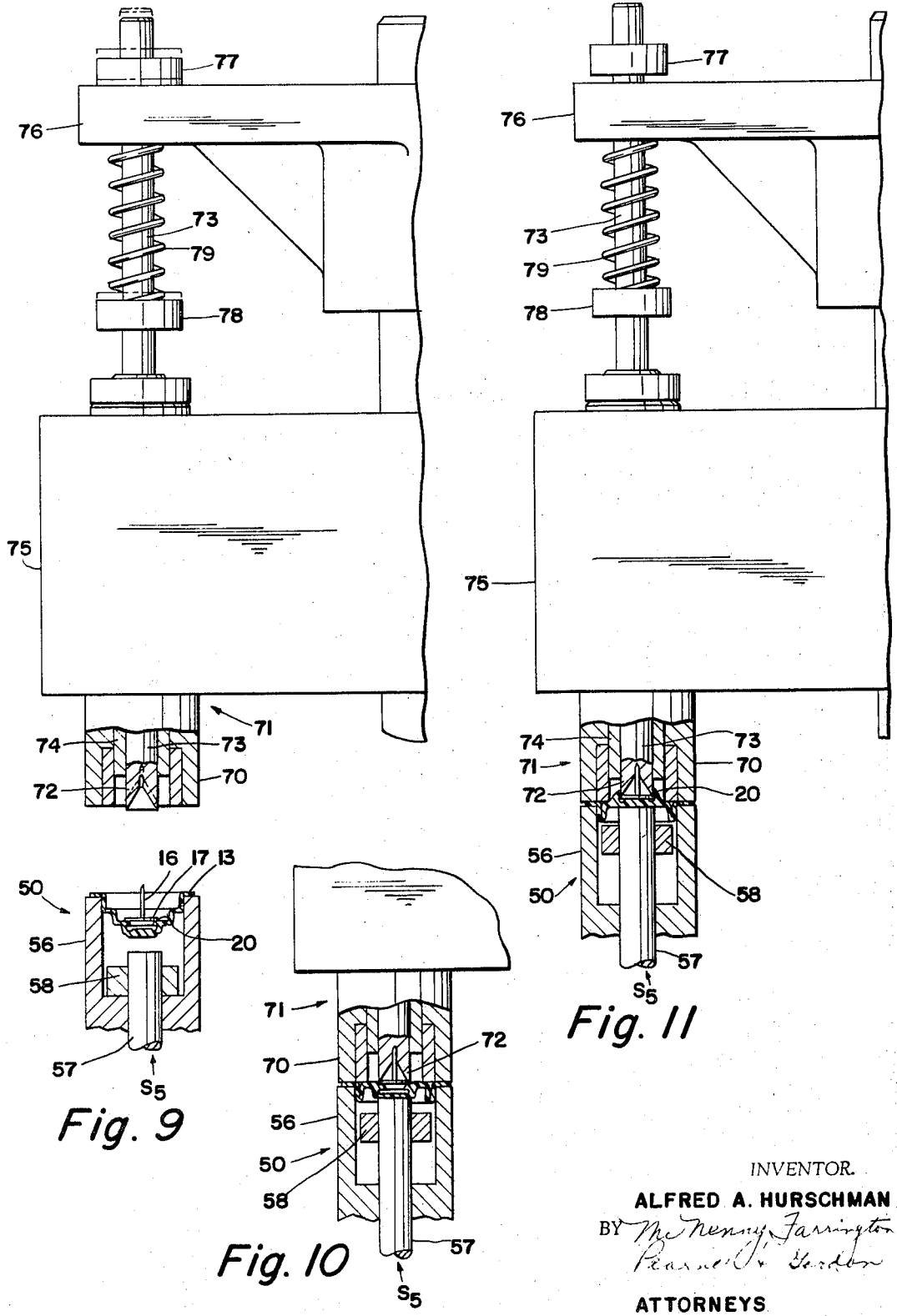

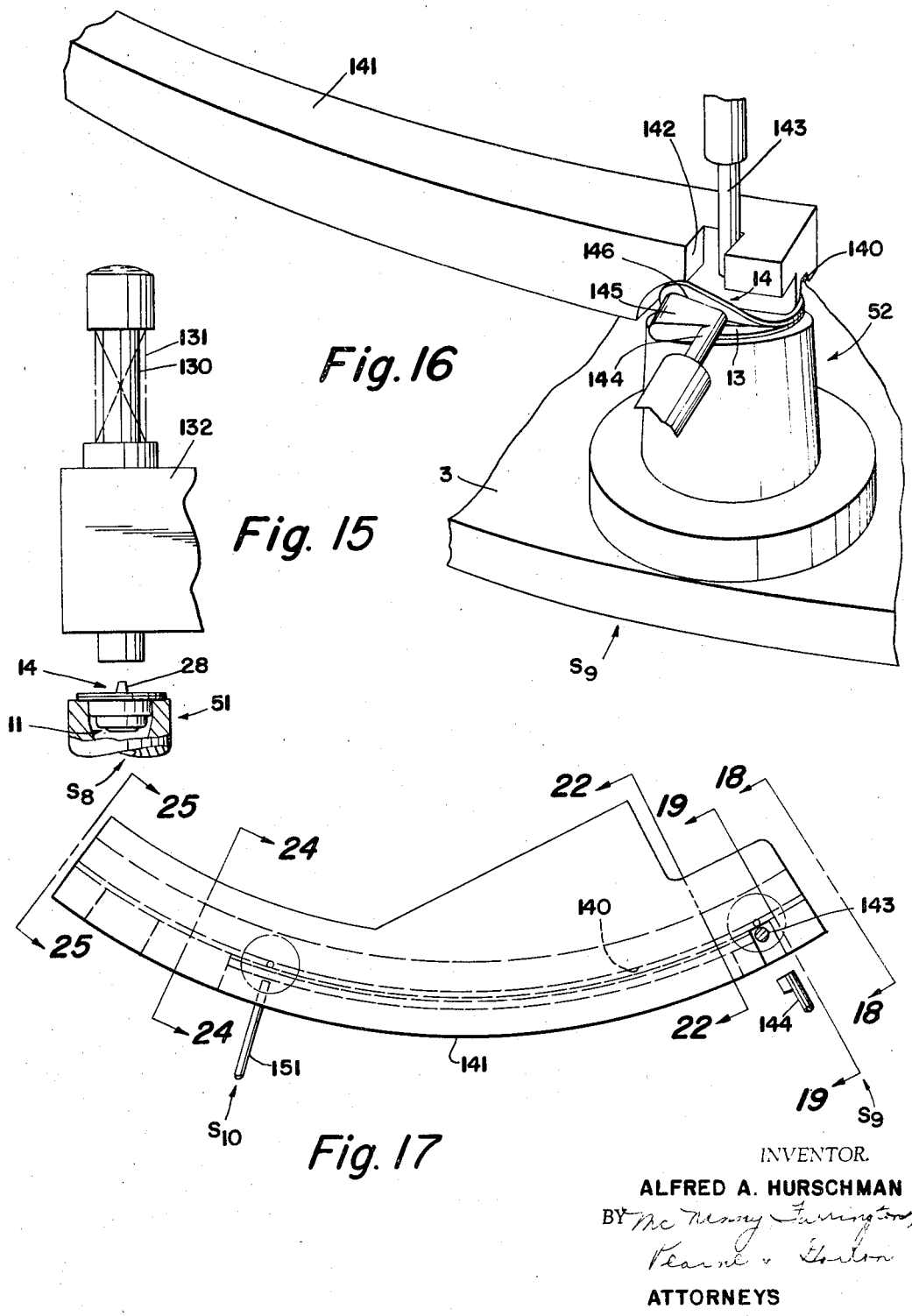

United States Patent Office 3,422,594
Patented Jan. 21, 1969

3,422,594
ASSEMBLY FILLING AND SEALING OF PLASTIC AMPOULES
Alfred A. Hurschman, Hudson, Ohio, assignor to Ampoules, Inc., Hudson, Ohio, a corporation of Ohio
Filed Nov. 20, 1964, Ser. No. 412,615
U.S. Cl. 53—37                                21 Claims
Int. Cl. B65 5/04

ABSTRACT OF THE DISCLOSURE

A method and apparatus for assembling, filling and sealing a hypodermic ampoule having a cup-shaped flexible body, and end wall sealed across the mouth of the body, a hypodermic needle contained within the body, and a fluid to be injected within the ampoule.

---

This application relates to hypodermic syringes and, particularly, to the assembly, filling, and sealing of a particular type of disposable hypodermic syringe in the form of a collapsible ampoule entirely enclosing the hypodermic needle and the fluid to be injected. More specifically, the invention involves new methods and apparatus for assembling, filling, and sealing such hypodermic syringes.

The general type of disposable hypodermic syringes to which the present invention relates and preferred forms of the components of such devices, methods of making the needles used therein, methods and apparatus for sealing the plastic ampoules, and applicators preferably employed in using the devices are disclosed in detail in Russell P. Dunmire U.S. Patents 2,696,212, 2,769,443, 3,094,987, and 3,094,988, Russell P. Dunmire (by Hannah Dunmire, executrix) pending U.S. applications Ser. Nos. 252,272 and 252,274, filed Jan. 15, 1963, and joint Russell P. Dunmire (by Hannah Dunmire, executrix) and Harry C. Eby pending U.S. applications Ser. No. 158,944, filed Dec. 8, 1961, and Ser. No. 374,870, filed May 25, 1964.

By way of summary of the features of such hypodermic syringes that are pertinent to the present invention, each such syringe comprises a cup-shaped, elastically collapsible body of molded plastic or the like having a relatively rigid endwall, a collapsible sidewall, and an open end opposite the rigid endwall. A hypodermic needle is contained within the body with the butt end of the needle mounted on said endwall of the body in communication with the body interior, and with the discharge end of the needle directed outwardly. A flexible and puncturable diaphragm closes said open end of the body and includes a needle-embracing gland for receiving the discharge end of the needle with an interference fit. The diaphragm is adapted to be pierced at the gland portion thereof by the needle when the body is collapsed to project the needle into a patient and discharge an injection fluid from the body through the needle. Between mating flanges of the body and diaphragm, an electrically conductive metal ring is enclosed as an aid in generating heat by electrical induction during sealing of those flanges to each other entirely around an annular sealing zone.

As disclosed in the above-mentioned Dunmire pending application Ser. No. 252,272, it was originally contemplated that the assembly, filling, and sealing of such hypodermic devices would be performed in accordance with the following steps:

(a) mounting the butt end of the needle on the endwall of the body in its outwardly directed position;
(b) then, while the body is disposed with its open end uppermost, filling the body with the injection fluid to be contained therein; and
(c) then placing the diaphragm in its body-closing and needle-embracing position and sealing the periphery of the diaphragm to the body about the open end of the body.

Although this turned out to be a mechanically feasible sequence of assembly, filling, and sealing steps, the necessity for following such steps presented a number of practical problems in the merchandising of the component parts and in the use of those parts by a pharmaceutical manufacturer to produce filled, finished hypodermic devices for distribution to hospitals, pharmacies, doctors, etc. One of these problems involved the handling of the component parts of the hypodermic devices as separate items to be fed to some kind of machine for assembling, filling, and sealing the devices under the sterile conditions required by the nature of the injection media and by the necessity of administering the injection media through a needle that punctures the skin of the patient. As is well understood in the art, absolute cleanliness and sterility of the injection media, the needle, and all packaging surfaces to which the injection media are exposed is of vital importance. Although machinery was developed and successfully operated for handling the component parts of the hypodermic devices and assembling, filling, and sealing them under the required clean and sterile conditions, the complexity and expense of such machines required in each pharmaceutical plant in which the devices are assembled and filled constituted a serious commercial objection to utilizing the devices and presented a major obstacle to be overcome in establishing large scale and widespread use of the devices (despite the many advantages which the finished and filled devices provided and despite the several problems in the administration of drugs by hypodermic injection which such devices had been proven to alleviate or eliminate entirely).

In addition to the objectionable cost and complexity of such machines, the continuous series of assembly, filling, and sealing operations that was combined in a single machine and enclosed for operation under aseptic and sterile conditions complicated the important tasks of (a) detecting improper operation of any part of the machine, (b) rejecting defective ampoule parts, subassemblies, or completed and filled assemblies, and (c) making the repairs in or adjustments of the machine that were required to correct its faulty operation.

From the standpoint of the manufacturer of the components of the hypodermic devices, complications and expenses inherently involved in keeping an inventory of the several components and separately packaging them for shipment to the pharmaceutical manufacturer unnecessarily complicated and rendered more expensive the handling of the components up to the time they were received by the pharmaceutical manufacturer. Although the obvious answer to problems of this kind seemed to be to preassemble the components before they were shipped to the pharmaceutical manufacturer for filling, an apparent need for partially disassembling the devices by removing their diaphragms in order to fill them only appeared to further complicate the handling of the component parts by the pharmaceutical manufacturer. Obviously, the devices could not be completely sealed at the factory where they were made prior to shipping them to the pharmaceutical house for filling, and there was no apparent practical way in any mass production operation (required for the economical use of the devices) in which to fill the devices if preassembled and partly sealed to hold them together during packaging and shipment by the manufacturer of the devices and subsequent handling by the pharmaceutical manufacturer or packager.

When it is considered that the hypodermic devices involved are single-dose dispensers that are to be used only once and discarded, it will be better appreciated how the foregoing problems could be so serious as to threaten the success of any effort to exploit commercially their recognized, intrinsic advantages over other injection devices. Until the present invention, the lack of any practical answers to the foregoing problems threatened to price the devices out of the disposable hypodermic syringe market, at least to the extent of greatly limiting their use in medical fields requiring subcutaneous or intradermal injections. These problems have been wholly removed by the present invention, as will hereinafter appear.

An initial discovery of basic importance to the success of the present invention was that the interference fit of the discharge end of the hypodermic needles in the gland of the diaphragm, as required to provide a seal against the escape of liquid around the needle while performing an injection, provides a sufficient grip of the gland of the diaphragm on the discharge end of the needle to securely hold the components of the injection devices in a completely assembled relationship without the necessity for providing any other attachment between the diaphragm and the cup-shaped, collapsible body of the hypodermic devices. It was found that the preassembled components, held together in this manner, would reliably resist accidental separation during packaging and shipment to a pharmaceutical house and during feeding of the assembled devices into and through a filling and sealing machine. When this had been discovered, a major problem remaining to be solved was one of perfecting an improved method and improved apparatus for more rapid and, for the first time, complete assembly of all of the components of the hypodermic devices in an empty condition. Here the objectives were to simplify and render more reliable those portions of the prior, single, assembly, filling, and sealing machine that performed similar assembly steps. This was achieved, as hereinafter described, with substantial departures from both the prior method and the prior apparatus.

The next problem remaining to be solved was that of efficiently receiving the assembled hypodermic devices from a bulk supply and filling and sealing them without the necessity for removing the diaphragm. In working upon this second problem, it was found that the diaphragm could be flexed or bent away from the body at any point around its periphery without being separated from or punctured by the needle, so as to enable the formation of a sufficient opening to receive a filling tube through which a liquid medicament could be fed in accurately metered amounts, whereupon the filled ampoule could be withdrawn to permit the diaphragm to return to its normal position and be sealed to the body around the entire peripheries of the diaphragm and body. As will be hereinafter more fully explained, a slight downward pressure at the proper point on the diaphragm of the preassembled unit while properly supporting the diaphragm in the region of its needle-embracing gland was found to cause sufficient separation of the gland and the body adjacent the point of such pressure to permit a separating blade to slide between them and bend back that portion of the periphery of the diaphragm to provide the required filling opening.

In the course of the evolution of the new methods and apparatus, the possibility that, in some instances, assembly, filling, and sealing in the same factory would be desired was kept in mind. Accordingly, the new apparatus developed for assembling the ampoules and, as a separate operation, filling and sealing the assembled ampoules was designed in a manner to facilitate recombining the separated operations and corresponding machine components into a single, continuous procedure and machine, while greatly simplifying the previously available machine, reducing its size, and increasing its reliability.

Thus, as will hereinafter appear, independent machines were developed which employed a common design principle enabling them to be readily combined, through a cooperating transfer mechanism, into a unitary machine with coordinated and synchronized feeding of ampoule components, assembly of empty ampoules, filling of the assembled ampoules, sealing of the filled ampoules, and final discharge of the filled ampoules, and with the parts, subassemblies, and complete assemblies moving in a continuous line of progression from beginning to end of the system. In these last respects, the present invention achieved a bonus result of providing a greatly improved, single method and machine for performing, when desired, the end result of the original, unsatisfactory method and machine in a more reliable and economical manner.

As will be apparent from the foregoing, the principal objects of the present invention are to eliminate the inventory, packaging, and handling problems initially encountered with these hypodermic devices, as explained above, by providing a practical and economical mass production method for preassembling the components of the hypodermic devices, for subsequently filling and sealing the preassembled hypodermic devices witheout the necessity for removing and replacing the diaphragm in the course of the filling operation.

Secondary objects of the invention are to accomplish the first-mentioned, principal objects of the invention in a manner permititng, when desired, the efficient and economical combining of the assembly portion of the invention with the filling and sealing portion of the invention so as to provide an improved, composite method and apparatus heretofore considered comercially impractical.

How the present invention accomplishes the foregoing objectives will become more fully aparent from the following detailed description of the presently preferred assembly, filling, and sealing, method steps and apparatus for carrying out those steps and from the accompanying drawings illustrating each of the preferred method steps and the basic machine elements and relationships employed in carrying out those steps.

In the drawings:

FIG. 3 is a sectional, elevational view on the scale of FIG. 1 of the assembled hypodermic device in a stage of partial collapse while being axially compressed between the plunger and end plate of the applicator of FIG. 2;

FIG. 4 is a view similar to FIG. 3, but showing the hypodermic device in a fully collapsed condition;

Figure 1:
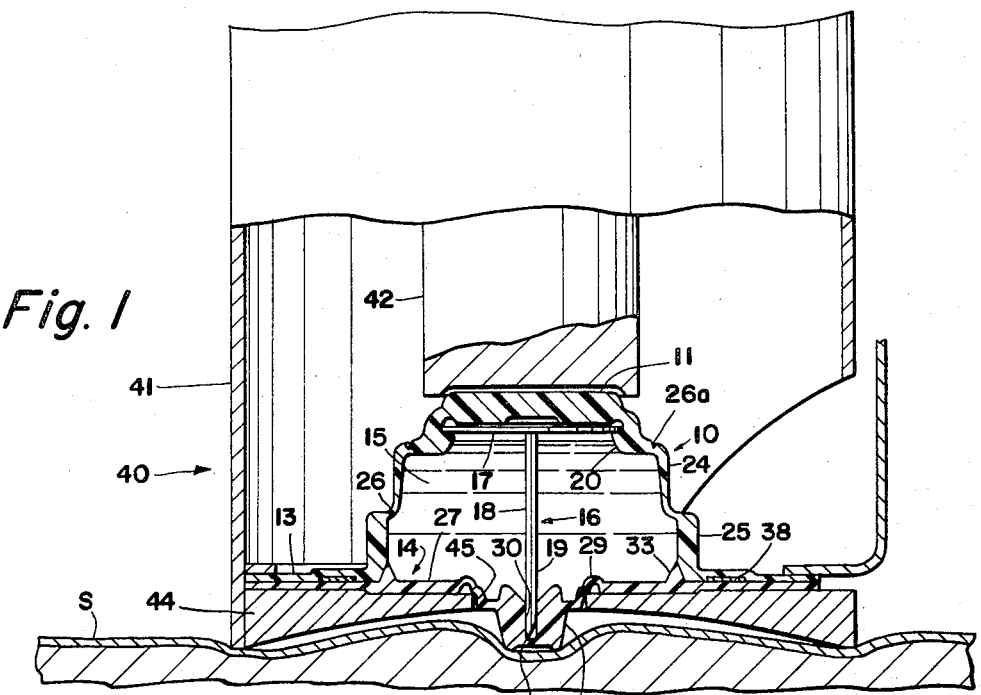
FIG. 1 is a greatly enlarged, elevational view, partly broken away and shown in section for clarity, of an assembled, filled, and sealed hypodermic syringe in position in an applicator (fragmentarily shown) disposed against the skin of a patient to be injected.
Figure 12:
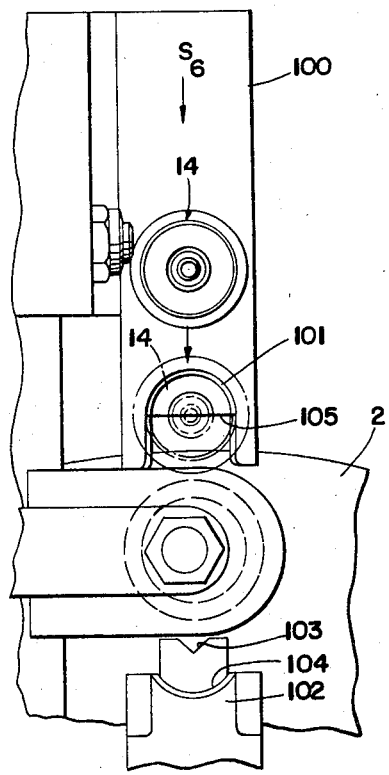
Figure 13:
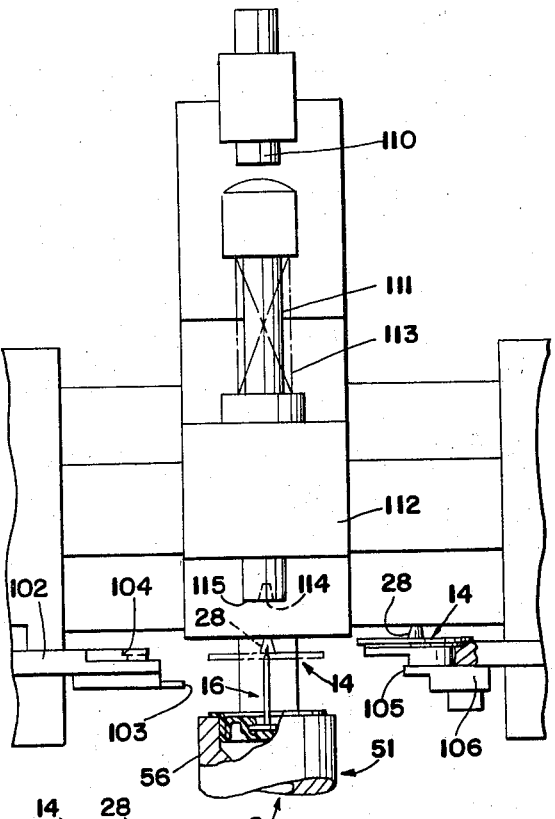
Figure 14:
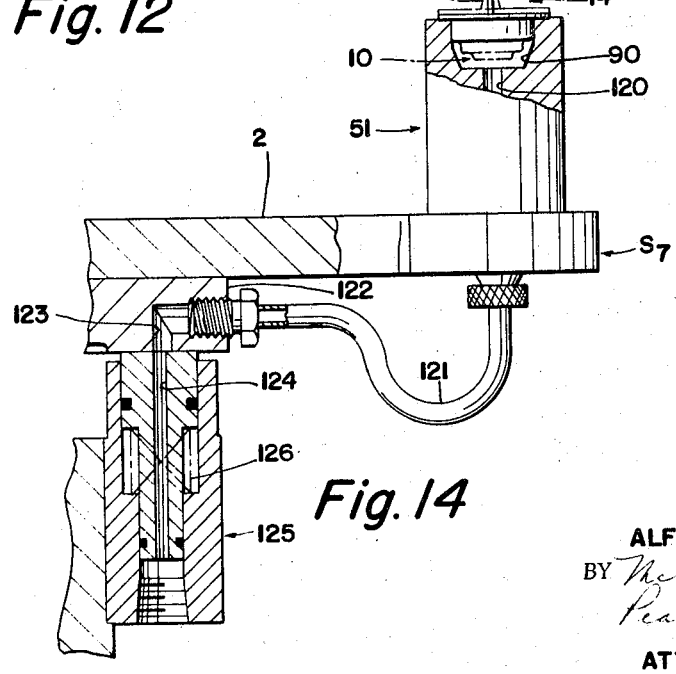
Figure 18:
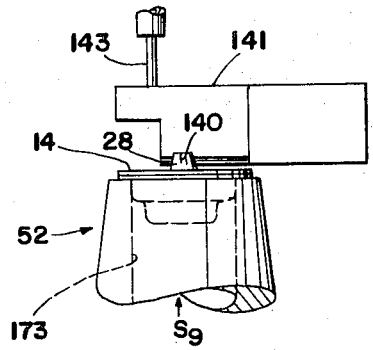
Figure 19:
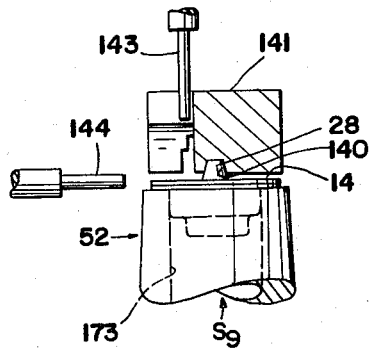
Figure 20:
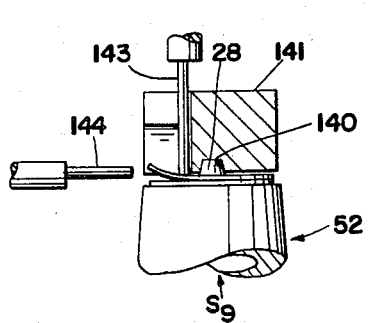
Figure 21:
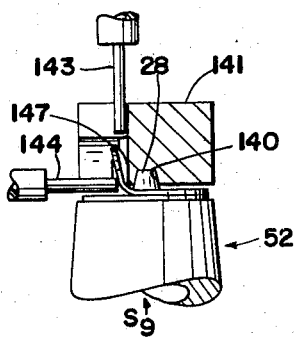
Figure 22:
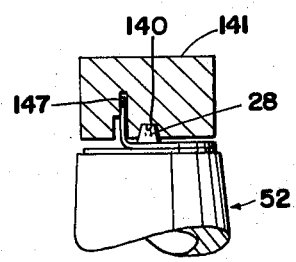
Figure 23:
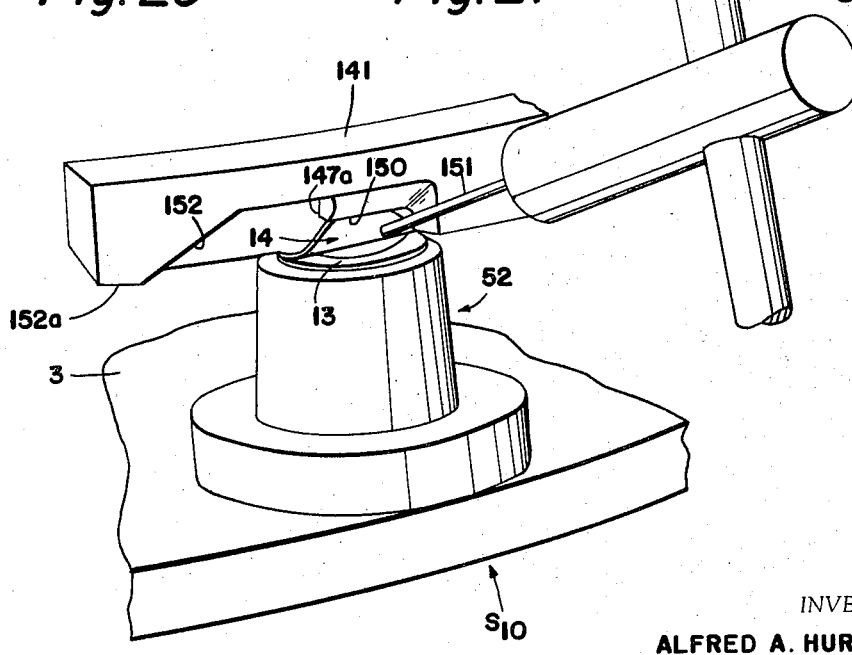
Figure 24:
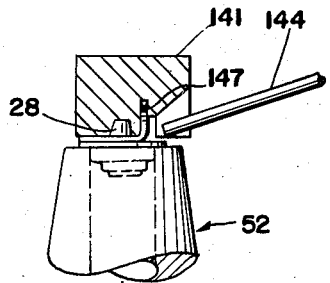
Figure 25:
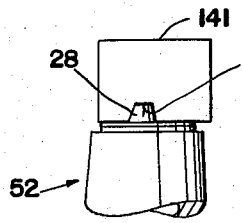
Figure 26:
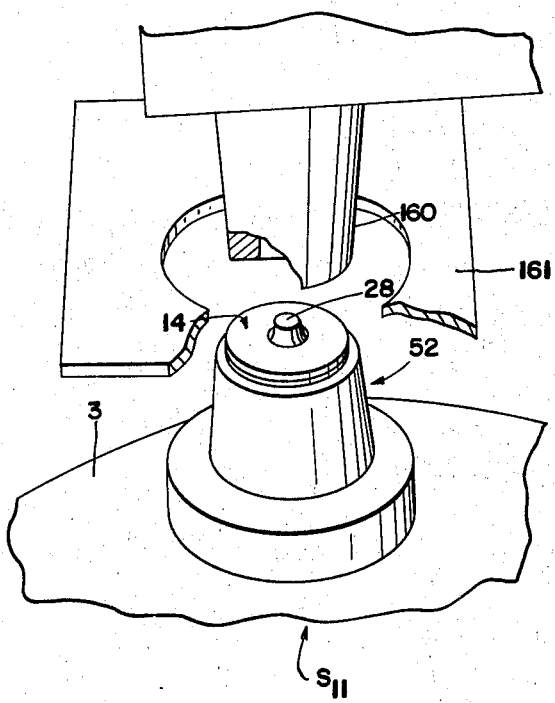
Figure 27:
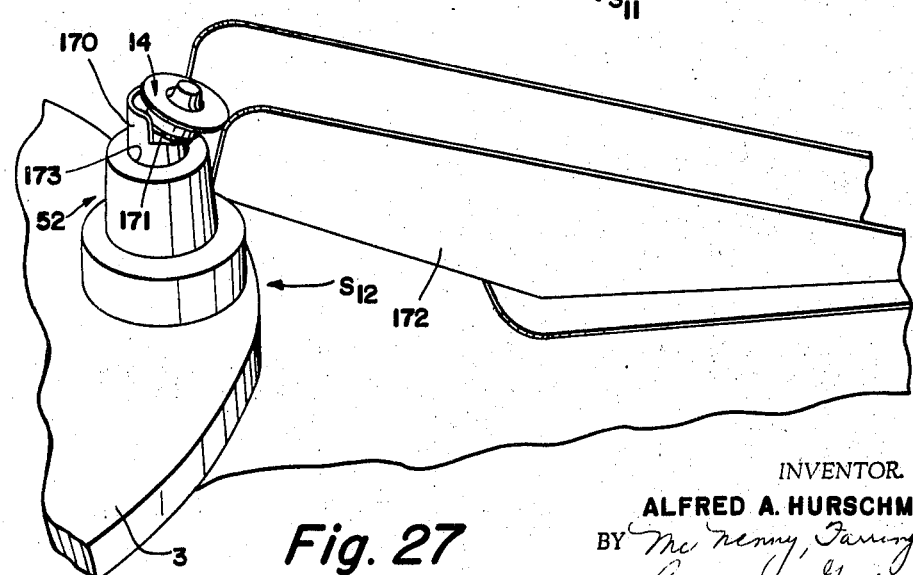

FIG. 5 is a schematic plan view showing a pair of rotary tables or turrets (designated Table 1 and Table 2) suitably arranged for synchronized stepwise rotation in 45° increments between adjacent work stations (of which those designated $S_0$ are idle stations), each station being available for performing a particular operation in the assembly of an ampoule, a pair of adjacent stations (jointly designated $T_{1-2}$) on these two tables being used for transferring a partial ampoule assembly from the table at the left to the adjacent table where the assembly is to be completed; this view also showing a third rotary table of turret (Table 3) of similar character that is adapted to be used, either independently and separated from the other two tables or (with a transfer of complete ampoule assemblies at adjacent stations $T_{2-3}$) in synchronized cooperation with the other two tables for receiving complete ampoule assemblies and filling and sealing them;

FIG. 6 is a fragmentary, partially sectioned, elevational view of the construction of one of the eight identical work holding portions of the first rotary table (Table 1) of FIG. 5, showing the work holder after a cup-shaped ampoule body has been placed in the work holder at station $S_1$, a metal sealing ring has been loosely placed on the peripheral flange of the ampoule body at station $S_2$, and a needle has been loosely positioned in the ampoule body at station $S_3$, preparatory to permanently securing these parts together at subsequent stations, the plane of the section being indicated by the line 6—6 in FIG. 5;

FIG. 7 is a fragmentary, elevational view of the structure of FIG. 6 after the work holder on the first table (Table 1) has progressed to station $T_{1-2}$ for transfer to the second table (Table 2), the view additionally showing, partially in section, the transfer mechanism and, in position for receiving the work at the transfer station $T_{1-2}$, the construction of one of eight identical work holders and its mounting on the second rotary table (Table 2), the plane of the section being indicated by the line 7—7 in FIG. 5;

FIG. 8 is a fragmentary, partially sectioned, elevational view similar to the upper part of FIG. 6 after the work holder and the work held thereby have advanced through an idle station $S_0$ to a ring seating or "staking" station $S_4$ for spot sealing the ring to the ampoule body flange, the plane of the section being indicated by the line 8—8 in FIG. 5 and the view also showing the associated spot sealing mechanism at station $S_4$;

FIG. 9 is a view similar to FIG. 8, but taken at station $S_5$ and showing the ampoule body, ring, needle, and work holder in operative relationship with associated machine elements at that station for seating or "staking" the needle to the end wall of the ampoule body, the plane of the section being indicated by the line 9—9 in FIG. 5;

FIG. 10 is a view at station $S_5$ similar to and showing a part of the structure of FIG. 9 after upward actuation of the work holder to clamp the ampoule body about its peripheral flange and after partial, further, upward actuation of the piston rod in the work holder for collapsing and partially inverting the ampoule body to bring the head of the hypodermic needle into engagement with a needle staking tool, but before the piston rod has completed its upward stroke for opening the needle seat to receive the base of the needle;

FIG. 11 is a view at station $S_5$ substantially identical with FIG. 9 except that the several upwardly moved machine elements have all reached the ends of their upward strokes and the needle-retaining flange of the ampoule body has been opened up to permit the needle to drop onto its seat on the lower end wall of the ampoule body while guided and urged to that position by the needle staking tool;

FIG. 12 is a fragmentary plan view of station $S_6$ and associated mechanism located at that station for moving the ampoule diaphragm into vertical alignment with the ampoule needle and lowering the diaphragm to receive and grip the pointed tip of the needle within the diaphragm gland, the ampoule diaphragm being shown in solid outline in the process of being fed to a seat on one of the machine elements and in phantom outline after it has been seated thereon;

FIG. 13 is an elevational view of station $S_6$ and the associated mechanism of FIG. 12, this view also showing, partially in section, the work holder and the preassembled and still collapsed ampoule body with the staked needle projecting upwardly for insertion into the diaphragm gland, the work holder and ampoule body and needle being shown partly in section as indicated by the line 13—13 in FIG. 5;

FIG. 14 is a fragmentary, partially sectioned, elevational view of station $S_7$ and associated mechanism for applying suction to return the ampoule body to its original, uncollapsed condition with the needle seated in the body end wall and the diaphragm staked onto the needle and closing the body, the plane of the section being indicated by the line 14—14 in FIG. 5;

FIG. 15 is a fragmentary, elevational view of station $S_8$ and associated mechanism for "restriking" the diaphragm to insure that the pointed end of the needle has penetrated the proper distance into the diaphragm gland;

FIG. 16 is a perspective view of station $S_9$ and associated mechanism for lifting a peripheral portion of the diaphragm flange of an assembled, empty ampoule, a portion of the associated mechanism in this case being a guide that extends along the arcuate path of travel of the ampoule to a filling station $S_{10}$ for holding the peripheral portion of the diaphragm flange in its lifted position to provide a filling opening when the assembly arrives at the filling station;

FIG. 17 is a plan view of stations $S_9$ and $S_{10}$ and part of the associated mechanisms at both stations, including part of the mechanism at station $S_{10}$ for metering liquid medicament from a filling tube into the assembled ampoule through the opening provided by the operation at station $S_9$;

FIG. 18 is an elevational view taken as indicated by the line 18—18 in FIG. 17, and FIGS. 19, 20, and 21 are vertical, sectional views taken as indicated by the line 19—19 in FIG. 17, all showing the mechanism at station $S_9$ in successive stages of operation; and FIG. 22 is a similar view taken at a slightly more advanced location indicated by the line 22—22 in FIG. 17 and with the ampoule advanced slightly beyond station $S_9$ in the direction of station $S_{10}$;

FIG. 23 is a fragmentary perspective view of station $S_{10}$ and the associated mechanism for filling an ampoule and closing it as it leaves station $S_{10}$ for travel to station $S_{11}$;

FIG. 24 is a vertical, sectional view and FIG. 25 is a similar elevational view of the mechanism at station $S_{10}$, respectively taken as indicated by the lines 24—24 and 25—25 in FIG. 17;

FIG. 26 is a fragmentary, elevational view of station $S_{11}$ and associated mechanism for sealing the diaphragm about its periphery to the peripheral flange of the filled ampoule body; and FIG. 27 is a fragmentary, elevational view of station $S_{12}$ and associated mechanism for lifting the filled and sealed ampoule out of its work holder and discharging it from the filling and sealing machine.

THE AMPOULE AND ITS USE

Figure 2:
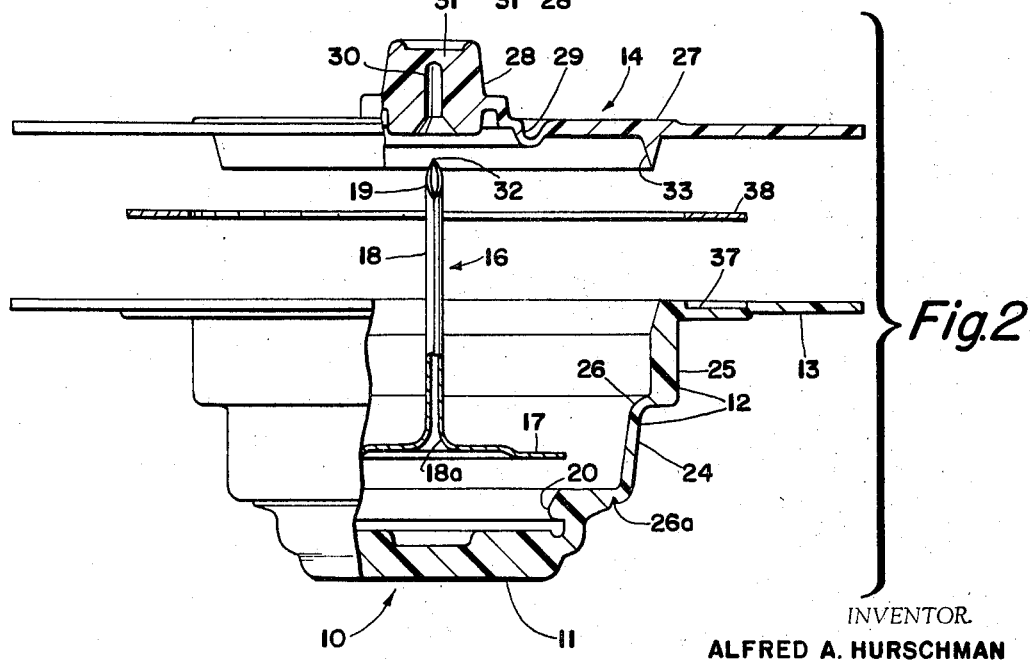
FIG. 2 is a further enlarged, exploded, elevational view of a hypodermic device of the type to which the invention relates, the cup-shaped ampoule body being shown partly in section and disposed in the upside-down position which it must occupy during the filling and sealing operations, and other parts being shown partly or entirely in section for clarity.

Reference is first made to FIGS. 1 through 4, and particularly to FIG. 2, which shows the components of a hypodermic ampoule device which may be assembled, filled, and sealed according to this invention. As shown, the hypodermic ampoule has an elastically collapsible body 10 of molded plastic or the like in the general form of an inverted cup-shaped shell defined by an upper end-wall 11 and a circumferentially extending sidewall 12. A peripheral, outwardly directed flange 13 integrally extends around the open end or mouth of the body 10, and a disk-like diaphragm 14 is peripherally sealed to this flange 13 by a technique which will hereinafter be described, so as to close the mouth of the body and form a sealed fluid reservoir containing a hypodermic liquid 15.

A hypodermic needle 16, which preferably is of the type disclosed in the aforementioned copending application of Russell P. Dunmire (by Hannah Dunmire, executrix) and Harry C. Eby, Ser. No. 158,944, filed Dec. 8, 1961, is mounted entirely within the ampoule. A circular base or butt end 17 of the needle is clamped adjacent the inner surface of the upper endwall 11 by an annular, radially inwardly directed needle-clamping flange or rib 20 so that a cannula 18 of the needle 16 is disposed in axial alignment with the ampoule and has a pointed, discharge end 19 extending downwardly in position to be forced through the diaphragm 14. A cannula opening 18a is formed through the butt end 17 of the needle so that the hypodermic fluid 15 can be evacuated from the ampoule through the needle after it has pierced the diaphragm.

As is more specifically described in the patent to Dunmire, Patent No. 3,094,987, the body 10 includes a top section defined by a flexible, top sidewall portion 24 of the circumferential sidewall 12 and a bottom section of larger diameter which is defined by a relatively rigid and inflexible bottom sidewall portion 25 of the sidewall 12. The portion 24 of the sidewall 12 is tapered from a maximum thickness at its upper end to a minimum thickness at its lower end, while the portion 25 of the sidewall 12 has a thickness approximately twice the maximum thickness of the top sidewall portion 24. The top and bottom sidewall portions 24 and 25 are integrally connected by a shoulder portion 26, which is no thicker, and may be slightly thinner, than the minimum thickness of the top sidewall portion 24. This shoulder defines the location of a primary hinge about which the circumferential sidewall 12 of the ampoule is folded to initiate collapsing thereof by a progressive inverting movement of the top sidewall portion 24 downwardly within the bottom sidewall portion 25 when axial pressure is applied to the ampoule.

As is more specifically described in Dunmire Patent No. 3,094,988, the diaphragm 14 is constructed to avoid a rapid build-up of hydraulic pressure within the liquid-filled shell and a consequent "hydraulic lock" which could result in the ampoule body's being ruptured before the hypodermic needle 16 can be forced through the diaphragm at the initiation of an injection. Provision is also made to guide the hypodermic needle 16 for entry into the skin in a direction substantially perpendicular thereto and to prevent an undesirable loss of the hypodermic liquid 15 during an injection by leakage around the outside of the needle where it pierces the diaphragm 14.

To these ends, the diaphragm 14 has an outer annular portion 27, a thick, elongated, centrally located needle-guiding and liquid-sealing gland 28, and a relatively thin, flexible, corrugated, intermediate portion 29 connecting the gland and outer portion to permit relative movement therebetween. An axial needle passage 30 extends into the upper end of the gland 28 from inside the ampoule shell and terminates short of the opposite, lower end of the gland to form a thin, easily puncturable wall 31 closing the bottom of the passage. A portion of the needle 16 is slidably constrained within the passage with an interference fit and with the tip 32 of the needle only slightly spaced (about 0.03 inch) from the puncturable wall 31.

The diaphragm 14 is further shown to include a stiff, annular rib 33 integrally extending from the upper surface of the outer diaphragm portion 27. This rib 33 is formed on a diameter such that it may be tightly nested within the mouth of the ampoule body 10 against its inner wall surface.

The circumferential flange 13 is preferably formed with an annular groove 37 in which is seated an electrically conductive ring 38. The ring 38 is preferably made of stainless steel such as AISI Type 410 martensitic or AISI Type 304 austenitic stainless steel. In the preferred form of this invention, the conductive ring 38 is a flat, annular disk.

A hypodermic injection may be effected by collapsing the hypodermic ampoule axially against the skin S of the patient. The axial force necessary to collapse the ampoule may be applied manually or, preferably, by a mechanical applicator 40 which is shown fragmentarily in FIG. 1. The applicator 40 is set forth in greater detail in copending U.S. application Ser. No. 252,274, filed Jan. 15, 1963 and now Patent No. 3,236,237. The applicator 40 comprises an outer, tubular shell or body 41, and a plunger 42 which is mounted within the shell 41. The applicator 40 further includes a mechanism (not shown) for driving the plunger 42 downwardly from the position illustrated in FIG. 1 until the ampoule 10 is in the collapsed position illustrated in FIG. 4. The bottom of the tube 41 is closed by an end wall or plate 44, which supports the diaphragm portion 14 of the ampoule. The gland 28 projects through an opening 45 in the plate 44 and rests against the skin S when the applicator and ampoule are in a ready-to-fire position. The gland 28 is flexed upwardly when the applicator 40 is pressed against the skin just prior to firing.

As may be seen in FIGS. 3 and 4, when pressure is applied to the upper endwall 11 by the plunger 42, the shoulder 26 defines the location of a primary hinge about which the sidewall is folded to initiate collapsing thereof. Continued application of pressure forces the flexible upper sidewall portion 24 to progressively roll downwardly on itself until it is substantially turned inside-out and telescoped within the bottom portion 25. A secondary hinge, which is located at a notch 26a, is closed when the flexible upper sidewall portion 24 is completely telescoped within the bottom portion 25 to minimize any tendency of the body 10 to assume its original shape after an injection has been completed.

GENERAL ARRANGEMENT OF APPARATUS

Referring to the schematic view in FIG. 5 of three rotary tables or turrets, respectively designated table 1, table 2, and table 3, and further identified by reference characters 1, 2, and 3, respectively, these tables may be of generally conventional design and comprise circular plates that are horizontally disposed and mounted on the upper ends of vertical shafts 4a, 4b, and 4c, respectively for rotation stepwise in 45° increments.

As previously indicated, tables 1 and 2 moves ampoule components from station to station during assembly of the components, part of the assembly taking place at stations about table 1, from which the partially assembled ampoules are transferred to table 2 for further advancement from station to station until the assembly is completed. Accordingly, the stepwise rotation of tables 1 and 2 should occur simultaneously, conveniently through a common drive. As also previously indicated, the preassembled ampoules arriving at a discharge or transfer station on table 2 may be similarly transferred to table 3 on which the ampoules are filled and sealed and from which they are discharged for consumer packaging; or the filling and sealing operations for which table 3 is provided may be performed independently, for example, in a pharmaceutical house to which the preassembled ampoules are shipped by the ampoule manufacturer. In the former case, stepwise rotation of table 3 should occur simultaneously with that of tables 1 and 2, preferably effected by a common drive, the assembled ampoules arriving at a discharge or transfer station $T_{2-3}$ being transferred directly to table 3 at that station for movement through the filling, sealing, and discharge operations. In the latter case, tables 1 and 2 may be part of a single machine and table 3 part of a completely separate and independent machine, any suitable means, including hand feeding, being employed to place assembled ampoules, one at a time, in work holders on table 3 as the work holders arrive at station $T_{2-3}$ of that table. Thus, while tables 1 and 2 will normally be parts of a single machine, as indicated by bracketing them in the drawing, table 3 may be either part of that same machine or, as indicated by the dot-dash line between tables 2 and 3, may be completely separate and independently operated.

Whether combined in one machine or separated in the manner indicated, each of the tables 1, 2, and 3 has a number of work holders mounted thereon adjacent and uniformly spaced about its periphery. Conveniently, there may be eight such work holders spaced 45° apart about each table, the work holders on any one table being somewhat different in construction than those on the other two tables and the three types of work holders being only schematically shown in FIG. 5 and respectively designated 50, 51, and 52.

Referring now to FIG. 6, one work holder 50 is shown on a peripheral portion of table 1 and may comprise a flanged sleeve 53 mounted in an aperture through the table in a fixed position with a sleeve flange 54 resting on the top surface of the table, the sleeve serving as a guide support for a hollow shaft 55 and an integrally formed work holding cup 56, and the shaft 55 being slidable in the sleeve to raise and lower the cup 56. A piston rod 57 is slidably mounted in the hollow shaft 55 and projects upwardly into the cup 56 for acting upon an ampoule body as hereinafter described. The lowered position of the piston rod 57 is determined by a collar 58 fixed thereon and resting on the bottom of the cup 56. The lower ends of the hollow shaft 55 and piston rod 57 may extend downwardly for engagement by suitable lifting mechanisms (not shown) located at station $S_5$ for operation as hereinafter described. The work holders 51 on table 2 and 52 on table 3 are simplified versions of the work holders 50 on table 1 and are described in more detail hereinafter.

The several rest locations of the work holders on the three tables may be operating stations at which assembly, filling, or sealing operations are performed, or they may be idle stations, as required to provide adequate room at the operating stations for the particular mechanisms required to perform such operations. Referring again to FIG. 5, the operating stations, in order, are designated $S_1$, $S_2$, etc., through $S_{12}$, and the several idle stations, interspersed between work stations as required, are designated $S_0$. Merely for convenience of illustration, an arbitrary sequence of operating and idle stations has been shown in FIG. 5, but this sequence may be varied as desired to accommodate the size of the various mechanisms disposed at the several operating stations.

The operating mechanisms at each of the operating stations may be mounted in fixed positions at those stations in any desired manner and appropriately actuated during each dwell between advancements of the three tables.

With the foregoing description of the general arrangement of apparatus for assembling, filling, and sealing ampoules of the type disclosed in FIGS. 1–4, the steps of the assembly, filling, and sealing operations and associated mechanisms for performing those individual steps can best be described together in step-by-step sequence.

At station $S_1$ the ampoule bodies 10 are fed to table 1 and are dropped one at a time into the cup 56 at that station. Each ampoule body 10 is placed in a cup 56 so that its flange 13 rests on the upper surface portion of the cup.

At station $S_2$ the metal rings 38 are fed to table 1 and are inserted one at a time in the annular groove 37 on the flange 13 of the ampoule body 10.

At station $S_3$ the needles 16 are dropped one at a time into each body 10 so that the base 17 of the needle 16 rests on top of the annular flange 20. It will be seen that the annular flange 20 overlies the periphery of the needle base 17 when the further assembly operations involved in completing the final assembly will be described in further detail below.

These first assembly operations, which take place at stations $S_1$, $S_2$, and $S_3$, may be performed by hand or by any suitable feeding mechanisms (not shown). Such feeding mechanisms may comprise vibratory or gravity-feed mechanisms that are capable of delivering parts to a work station individually and in the proper orientation.

At station $S_4$, the metal rings 38 are spot-sealed at four equally spaced points about the rings to the ampoule body flange 13 and within the annular groove 37 by four correspondingly arranged heating elements 60. These heating elements are mounted in a vertically reciprocable head 61, as shown in FIG. 8 with the head movement indicated by an arrow at the right of the figure. Although only three of the heating elements 60 are shown in this figure, it should be appreciated that the fourth heating element 60 is directly in line with and behind the middle heating element in that figure. The head 61 is electrically heated, and the temperature of the elements 60 is thermostatically controlled. The head 61 and, therefore, the elements 60 are lowered to engage the rings 38 by an actuating shaft 62 to which the head 61 is connected by a pair of parallel arms or straps 63 and pins 64 which are adapted to flex any minute amount required to permit the four heating elements 60 of the head 61 to conform to the plane of the metal ring 38 and bear thereon with substantially equal pressures.

At station $S_5$ the needle 16 is staked in position by the apparatus shown in FIGS. 9, 10, and 11, and this staking operation involves the following operations.

As each work holder 50 arrives at station $S_5$, the entire work holder 50, with its partially assembled ampoule components (the body 11, the needle 16, and the ring 38), rises to clamp the flange 13 of the ampoule body 11 between the upper surface of the cup 56 and an outer sleeve 70 of a staking mechanism 71, which is rigidly located and held above station $S_5$.

After the flange 13 is clamped in this manner, the piston rod 57 continues to rise and, as may be seen in FIG. 10, engages the endwall 11 of the ampoule body 10. The endwall 11 is pushed upwardly in the same manner that the body 10 is collapsed by the applicator plunger 42 (FIG. 1) until the body 10 has been completely collapsed to the condition shown in FIG. 4. The piston rod 57 continues pushing the ampoule body 10 to further invert the body 10 and bring the periphery of the base 17 of the needle 16 into engagement with a rim 72 of a conically bored staking rod 73.

The staking rod 73 is slidably mounted within a guide sleeve 74, which, in turn, is mounted within the fixed outer sleeve 70 of the staking mechanism 71. The guide sleeve 74 and the outer sleeve 70 extend through and are fixed to a lower guide block 75. The staking rod extends beyond the lower guide block 75 and upwardly through an upper guide block 76. An upper collar 77 is fixed to the staking rod 73 and rests on the upper surface of the guide block 76. A lower collar 78 is fixed to the staking rod 73 between the upper and lower guide blocks and is biased downwardly by a weak spring 79.

After the periphery of the base 17 of the needle 16 is brought into engagement with the rim 72 of the staking piston 73, the piston rod 57 continues to push the ampoule body 10 upwardly against the bias of the weak spring 79. With the periphery of the base of the needle so restrained, the needle-clamping flange 20 of the ampoule body is forced to open so that the base 17 of the needle may drop freely into a seated position within the opening. Such seating is assured in the event of any slight misalignment by the force of the spring 79, which urges the staking piston 73 downwardly.

As was previously stated, the operating mechanisms at each of the operating stations may be mounted in fixed positions at those stations in any desired manner. Thus, the work holder 50 and its piston rod 57 may be operated in the sequence described above by, for example, suitable cams or other conventional devices.

After the needle has been staked in position, the piston rod 57 starts to retract and is followed by the ampoule body returning toward its normal collapsed position, as urged by its own elasticity and by the spring action on the staking rod 73. When the normally collapsed condition of the ampoule body 10 is reached, the annular flange 20 of the body will have closed over the periphery of the needle base 17 to lock it securely in its seated position (better shown in FIGS. 1, 3, and 4). The collar 77 on the staking rod 73 blocks further downward movement of the staking rod, and the entire work holder 50 then descends to its rest position shown in FIG. 6, leaving the ampoule body 10 in its normal collapsed position (better shown in FIG. 4) with the needle staked in place. It should be appreciated that the previously described groove 26a, which forms a secondary hinge, will prevent the ampoule body 10 from snapping back into its uncollapsed position.

The needle-staking operation is thus completed, and the table 1 advances to an idle position $S_0$ and then to the transfer position $T_{1-2}$.

A transfer mechanism 80 is located at the transfer position $T_{1-2}$, and this mechanism is shown most clearly in FIG. 7. The transfer mechanism 80 comprises a base member 81 in which a hollow, flanged shaft 82 is rotatably mounted. A shaft 83 is slidably received within the flanged shaft 82, and the shafts 82 and 83 are interconnected by a key 84 which prevents relative rotation between the shafts 82 and 83, but which permits axial movement of the shaft 83 relative to the shaft 82. A hub 85 is fixed to the top of the shaft 83, and the hub 85 carries a radially extending pick-up arm 86. A gripping member 87 is provided on the end of the arm 86 and has a central bore 88 which communicates with a bore 89 in the arm 86. The bore 89 communicates with a passageway (not shown) through the rod 83, which in turn is connected to a vacuum pump (not shown).

When a collapsed ampoule body 10 is advanced to the transfer station indicated in FIG. 7, a suitable cam mechanism (not shown) permits the shaft 83 and, therefore, the pick-up member to descend toward the collapsed ampoule body 10, as is shown in phantom outline at the left side of FIG. 7. As the pick-up member 87 approaches the ampoule body 10, the bore 88 is connected to the vacuum pump to pick the body 10 up out of engagement with its cup 56. It should be appreciated that the gripping member 87 need only be lowered into close proximity with the ampoule body 10 in order for the body to be lifted by the vacuum applied thereto.

After the ampoule body has been gripped by the member 87, the shaft 83 is raised to the position shown in solid outline in FIG. 7. The flanged shaft 82 is then rotated to bring the gripping member 87 into axial alignment with a work holder 51 on the table 2. The shaft 83 is then again lowered to bring the work holder 87 to the position indicated in phantom outline at the right-hand side of FIG. 7. The vacuum is then released, and the bore 88 is ported to atmosphere to permit the ampoule body 10 to drop into a cup 90, which is provided in the work holder 51.

After transfer of the assembled ampoule body 10, ring 38, and needle 16 to a work holder 51 on the table 2 at the station $T_{1-2}$, the table 2 is advanced to convey the assembly to station $S_6$. As is shown in FIG. 13, the ampoule body 10 is still collapsed with the needle projecting upwardly.

At station $S_6$, as may be seen in FIGS. 12 and 13 and indicated by an arrow in FIG. 12, an ampoule diaphragm 14 is pushed along a slidably mounted plate 100 by hand or by a suitable pushing mechanism (not shown). The plate 100 has a U-shaped, conically tapered seat 101 rabbeted into the upper surface thereof. As may be seen in phantom outline in FIG. 12 and in solid outline in FIG. 13, the diaphragm 14 is pushed until the rib 33 on the lower surface of the diaphragm drops into the seat 101. The slidably mounted plate 100 then slides to move the diaphragm into axial alignment with the needle 16 and stops in that position. As the plate 100 is advanced, an oppositely disposed slide member 102 having a notched leading end 103 and an arcuate seat 104 for the diaphragm rib 33 is advanced toward the plate 100 in a slightly lagging time sequence so that the plate 100 advances the diaphragm into axial alignment with the needle 16 prior to the arrival of the slide member 102. The edge 105 of a bracket 106 is carried by and below the plate 100, but above the level of the slide member 102, and engages the side of the needle 16 if the needle is cocked to the right of a plane perpendicular to the plane of FIG. 13. If the needle 16 is so cocked, the edge 105 pushes the needle into alignment in one plane. When the slide member 102 is then brought into position below the edge 105, the notch 103 in its leading end then embraces the needle and holds it against the edge 105 while guiding it into proper vertical alignment in a second plane, since the needle is drawn toward the apex of the notch 103. The needle is therefore included in and engaged by the three sides of a small triangular opening defined by the notch 103 and the edge 105 so as to be perfectly aligned on a predetermined vertical axis. The slide member 102 and its arcuate diaphragm seat 104 are simultaneously moved into a supporting position for the unsupported portion of the rib 33 and flange 13 of the diaphragm 14, thereby accurately aligning the diaphragm and the needle on the same vertical axis. The needle 16 is thus held in true vertical alignment, and the diaphragm 14 is vertically aligned therewith slightly above the tip thereof while being supported only about its outer periphery.

Thereupon, an upper actuating piston 110 descends to engage and depress a piston 111. The piston 111 is slidably mounted in a guide block 112 and is normally biased upwardly by a spring 113. The lower end of the piston 111 has a recess 114 in its lower end that freely receives the diaphragm gland 28. When the piston 111 is depressed against the bias of the spring 113, an annular end portion 115 of the piston 111 engages the diaphragm 14 adjacent the gland 28 to flex the corrugated portion 29 of the diaphragm and depress the gland 28 downwardly until the needle 16 has entered the needle passage 30. Before the piston 111 is permitted to retract and while the gland 28 is still held downwardly in embracing relationship with the needle 16, the slide members 100 and 102 are retracted to release the peripheral margin of the diaphragm 14 so that it moves freely downwardly to its normal relationship with the gland, whereupon the diaphragm is left supported only by the needle, as shown in phantom outline in FIG. 13. The piston 111 is then permitted to retract and the diaphragm-positioning operation is completed.

After the diaphragm-positioning operation, the work holder 51 is advanced to station $S_7$, and a work holder 51 at that station is illustrated in FIG. 14. As may be seen in FIG. 14, the work holder 51 is provided with an axial bore 120, which communicates with the work holding cup 90. The bore 120 is connected by a hose 121 to a block 122, which is rigidly fixed to the bottom surface of the table 2. The hose 121 communicates with a passageway 123 in the block 122. When the work holder 51 is at the station $S_7$, the passageway 123 is brought into fluid communication with a vacuum conduit 124, which is provided in a stationary valve member 125. The valve member 125 includes an off-on valve 126, which is actuated to connect the passageway 124 to a vacuum pump (not shown) when the work holder 51 moves to the position shown at station $S_7$. A vacuum is thereby created in the cup 90 to suck the central portion of the collapsed ampoule body 10 (shown in solid outline in FIG. 14) downwardly to its uncollapsed condition (shown in phantom outline in FIG. 14) while the flange 13 of the ampoule body is restrained by the upper surface of the work holder 51. Since the diaphragm 14 is still positioned on the end of the needle 16 (as shown in solid outline in FIG. 14), the diaphragm 14 is drawn down into contact with the flange 13 when the ampoule body is brought to its uncollapsed condition (as shown in phantom outline in FIG. 14). This completes the operation at station $S_7$, and the table 2 is then indexed to move the assembly to station $S_8$.

At station $S_8$ (FIG. 15), a piston 130 is pushed downwardly against the bias of a spring 131 by a pushing mechanism (not shown). The piston 130 is slidably mounted through a guide block 132 and is pushed downwardly so that its bottom end engages the diaphragm gland 28 if the diaphragm has not been fully seated on the needle 16. This may be termed a "restrike" operation and has, as its sole function, the correction of any failure at station $S_6$ to fully seat the tip of the needle into the needle passage 30 and/or to reseat the needle 16 if it is partially withdrawn from the needle passage 30 when the body 10 is returned to its uncollapsed position. The piston 130, therefore, has a limited downward travel so that it cannot push the diaphragm gland 28 too far onto the needle 16. After the restrike operation, the table 2 is indexed to carry the completed assembly to the discharge station or, optionally, the transfer station $T_{2-3}$.

By direct transfer to table 3 by a transfer mechanism like that shown in FIG. 7, if the table 3 is a part of the same machine with tables 1 and 2, or, by manual or mechanical feeding if table 3 is a separate and independent machine, assembled ampoules are placed on the work holders 52 of table 3 as they arrive at station $T_{2-3}$.

When the assembled ampoule and its work holder 52 are indexed to station $S_9$ on table 3 (FIGS. 16–21), the gland 28 of the diaphragm 14 is slidably but tightly received within a slot 140 of a fixed, arcuately extending guide block 141. The guide block 141 is provided with a vertical notch 142 at the station $S_9$, and the notch 142 provides an opening for a vertical plunger 143 to contact the diaphragm 14. The vertical plunger 143 descends and engages the diaphragm 14 closely adjacent the diaphragm gland 28 and at a point directly and radially opposite a horizontal side plunger 144. As may be seen most clearly in FIG. 16, the plunger 144 is provided with a pushing block 145, which has an arcuately formed front or leading edge surface 146 which conforms generally to the curvature of the periphery of the edge of the ampoule diaphragm.

With the horizontal plunger 144 in a retracted position, the vertical plunger 143 descends to engage the diaphragm 14 in the manner previously indicated. This downward pressure on the diaphragm 14 causes a slight distortion of the diaphragm outwardly of but close to the gland 28 and in a downward direction so as to tilt the outer periphery of the diaphragm adjacent the horizontal side plunger 144 in an upward direction, as may be seen most clearly in FIG. 20. With the outer periphery of the diaphragm 14 so tilted, the horizontal plunger is advanced into engagement with the upwardly tilted peripheral portion of the diaphragm 14 and pushes this portion further upwardly, as shown in FIG. 31. The groove 140 restrains the gland 28 so that the vertical plunger 143 does not force the gland 28 downwardly on the needle 16, and puncturing of the gland by the point of the needle is thereby avoided.

As is indicated in FIG. 21, the horizontal plunger 144 continues to push the peripheral portion of the diaphragm 14 further upwardly until that portion is disposed nearly vertically and partially in alignment with a vertical slot 147 that extends arcuately along the guide block 141 to the next station $S_{10}$. During this further upward pushing of a peripheral portion of the diaphragm by means of the horizontal plunger, the vertical plunger 143 is withdrawn upwardly out of the way. The arcuately formed edge 146 of the horizontal plunger 144 forms a continuation of the outer side of the slot 147 when this plunger has been fully extended to tilt the outer portion of the diaphragm 14 into substantial alignment with the slot 147. Thus, during the initial stages of the advance of the table 3 from station $S_9$ toward station $S_{10}$, the upturned periphery of the diaphragm slides along the edge surface 146 of the plunger 144 and into the slot 147 (as shown in FIG. 22). As the work holder 52 is further advanced toward station $S_{10}$, the periphery of the diaphragm is retained in and slides along the slot 147.

At station $S_{10}$ (FIGS. 23 and 24) an opening 150 is cut into the outer side of the guide block 141 to provide an open space under the upwardly bent edge portion of the diaphragm 14. The diaphragm, however, is still retained by an uncut-away portion of the block defining the upper portion of the slot 147. A fixed filling needle 151 is disposed in a fixed position with its discharge end projecting into the block opening 150 so that it projects over the flanged edge of the ampoule body and below the upwardly tilted portion of the diaphragm 14 when the assembly stops at the station $S_{10}$, as shown. Thereupon, a metered amount of the liquid medicament is injected through the needle 151 and into the ampoule body 10.

After the ampoule body has been filled, table 3 is advanced to move the filled ampoule assembly from station $S_{10}$ to station $S_{11}$. As the work holder 52 is being advanced from station $S_{10}$, the upwardly turned portion of the diaphragm 14 travels out of an open end 147a of the slot 147 and into engagement with a sloping arm surface 152 on the guide block 141 (FIG. 23). When the upwardly turned portion of the diaphragm 14 engages the cam surface 152, it is pushed downwardly to its normal position of engagement with the flange of the ampoule body as required to slide under a horizontal extension 152a of the cam surface 152 (FIG. 3).

At station $S_{11}$ (FIG. 26) a clamping head 160 descends into engagement with the periphery of the diagram 14 in vertical alignment with the metal ring 38, which is then heated by electromagnetic induction from a high frequency current conducting ring 161. The ring 161 may be mounted in a fixed position surrounding the clamping head 160 and just enough above the path of travel of the filled ampoule assembly for the diaphragm gland to be movable thereunder along its path of travel. This heat sealing operation is set forth in greater detail in Dunmire patent application Ser. No. 252,272.

When the heat sealing operation has thus been completed, the table 3 is advanced to bring the work holder 52 to the station $S_{12}$. At the station $S_{12}$, a plunger 170 rises to push the filled and sealed ampoule upwardly out of the work holder 52 so that the ampoule slides down an inclined upper end surface 171 of the plunger 170 and falls outwardly onto a slide 172 which carries the ampoule to a collection point for final customer packaging. The plunger 170 is mounted in a fixed, normally retracted position below and in axial alignment with the station $S_{12}$, so that it may rise through an opening (not shown) in the table 3 and through a bore 173 in the work holder 52.

The invention is not restricted to the slavish imitation of each and every one of the details described above, which have been set forth merely by way of example with the intent of most clearly setting forth the teaching of the invention. Obviously, devices may be provided which change, eliminate, or add certain specific details without departing from the invention.

Having thus described my invention, I claim:
1. In the assembly, prior to filling with fluid, of a hypodermic ampoule of the type comprising a cup-shaped, elastically collapsible body having an endwall and an open opposite end, a hypodermic needle contained within the body with the butt end of the needle mounted on said endwall of the body in communication with the body interior and the discharge end of the needle directed outwardly, and a flexible and puncturable diaphragm closing said open end of the body and including a needle-embracing gland for receiving the discharge end of the needle with an interference fit, said diaphragm being adapted to be pierced by the needle when the body is collapsed to project the needle into a patient and discharge said fluid, the assembly steps, while the body is empty, of:
  (a) turning the body at least partially inside-out to project the inner surface of its said endwall through said open end of the body;
  (b) mounting the butt end of the needle on the inner surface of said endwall of the body so as to resist separation thereof while said endwall is projecting outwardly as aforesaid;
  (c) placing the diaphragm in its needle-embracing position with the interference fit of the needle in the gland of the diaphragm holding the diaphragm in said position; and
  (d) returning the body to a right-side-out condition to draw the needle into the body in normal assembled relationship therewith and move the diaphragm into its normal, body-closing position for subsequent sealing of the diaphragm to the body after the body has been filled, but with the diaphragm separable from the body by flexing of the diaphragm at any point about its periphery to provide an opening through which the body may be filled with fluid.

2. In the assembly, prior to filling with fluid, of a hypodermic ampoule of the type comprising a cup-shaped elastically collapsible body having an endwall and an open opposite end, a hypodermic needle contained within the body with the butt end of the needle mounted on said endwall of the body in communication with the body interior and the discharge end of the needle directed outwardly, and a flexible and puncturable diaphragm closing said open end of the body and including a needle-embracing gland for receiving the discharge end of the needle with an interference fit, said diaphragm being adapted to be pierced by the needle when the body is collapsed to project the needle into a patient and discharge said fluid, the assembly steps, while the body is empty, of:
  (a) placing a conductive metallic ring on a circumferential flange portion of said body surrounding said open end of the body;
  (b) mounting the butt end of the needle on said endwall of the body; and
  (c) placing the diaphragm in its body-closing and needle-embracing position across the open end of the body so that said metallic ring lies between said flange and said diaphragm with the interference fit of the needle in the gland of the diaphragm holding the diaphragm in said position for subsequent sealing of the diaphragm to the body after the body has been filled.

3. In the assembly, prior to filling with fluid, of a hypodermic ampoule of the type comprising a cup-shaped, elastically collapsible body having an endwall and an open opposite end, a hypodermic needle contained within the body with the butt end of the needle mounted on said endwall of the body in communication with the body interior and the discharge end of the needle directed outwardly, and a flexible and puncturable diaphragm closing said open end of the body and including a needle-embracing gland for receiving the discharge end of the needle with an intereference fit, said diaphragm being adapted to be pierced by the needle when the body is collapsed to project the needle into a patient and discharge said fluid, the assembly steps, while the body is empty, of:
  (a) placing a conductive metallic ring on a circumferential flange portion of said body surrounding said open end of the body;
  (b) heat-sealing spot portions of said diaphragm to said flange about the periphery of said open end;
  (c) mounting the butt end of the needle on said endwall of the body; and
  (d) placing the diaphragm in its body-closing and needle-embracing position across the open end of the body so that said metallic ring lies between said flange and said diaphragm with the interference fit of the needle in the gland of the diaphragm holding the diaphragm in said position for subsequent sealing of the diaphragm to the body after the body has been filled.

4. In the assembly, prior to filling with fluid, of a hypodermic ampoule of the type comprising a cup-shaped elastically collapsible body having an endwall and an open opposite end, a hypodermic needle contained within the body with the butt end of the needle mounted on said endwall of the body in communication with the body interior and the discharge end of the needle directed outwardly, and a flexible and puncturable diaphragm closing said open end of the body and including a needle-embracing gland for receiving the discharge end of the needle with an interference fit, said diaphragm being adapted to be pierced by the needle when the body is collapsed to project the needle into a patient and discharge said fluid, the assembly steps, while the body is empty, of:
  (a) placing a conductive metallic ring on a circumferential flange portion of said body surrounding said open end of the body;
  (b) turning the body at least partially inside-out to project the inner surface of its said endwall through said open end of the body;
  (c) mounting the butt end of the needle on the inner surface of said endwall of the body so as to resist separation thereof while said endwall is projecting outwardly as aforesaid;
  (d) placing the diaphragm in its needle-embracing position with the interference fit of the needle in the gland of the diaphragm holding the diaphragm in said position;
  (e) returning the body to a right-side-out condition to draw the needle into the body in normal assembled relationship therewith and move the diaphragm into its normal, body-closing position; and
  (f) heat-sealing spot portions of said diaphragm to said flange about the periphery of said open end, but with the diaphragm separable from the body by flexing of the diaphragm at any point about its periphery to provide an opening through which the body may be filled with fluid.

5. In the assembly, prior to filling with fluid, of a hypodermic ampoule of the type comprising a cup-shaped, elastically collapsible body having an endwall and an open opposite end, a hypodermic needle contained within the body with the butt end of the needle mounted on said endwall of the body in communication with the body interior and the discharge end of the needle directed outwardly, and a flexible and puncturable diaphragm closing said open end of the body and including a needle-embracing gland for receiving the discharge end of the needle with an interference fit, said diaphragm being adapted to be pierced by the needle when the body is collapsed to project the needle into a patient and discharge said fluid, the assembly steps, while the body is empty, of:
  (a) turning the body at least partially inside-out to project the inner surface of its said endwall through said open end of the body;
  (b) mounting the butt end of the needle on the inner surface of said endwall of the body so as to resist separation thereof while said endwall is projecting outwardly as aforesaid;
  (c) placing the diaphragm in its needle-embracing position with the interference fit of the needle in the gland of the diaphragm holding the diaphragm in said position;

(d) returning the body to a right-side-out condition to draw the needle into the body in normal assembled relationship therewith and move the diaphragm into its normal, body-closing position for subsequent sealing of the diaphragm to the body after the body has been filled, but with the diaphragm separable from the body by flexing of the diaphragm at any point about its periphery to provide an opening through which the body may be filled with fluid; and (e) pushing the gland downwardly until the discharge end of the needle occupies a predetermined portion of said needle-embracing gland if the discharge end of the needle should have been left partially withdrawn from its normal assembled relationship by assembly step (d).

6. The method of filling and sealing a hypodermic ampoule comprising a cup-shaped, collapsible body having an endwall and an open opposite end, a hypodermic needle contained within the body with the butt end of the needle mounted on said endwall of the body in communication with the body interior and the discharge end of the needle directed outwardly, and a flexible and puncturable diaphragm closing said open end of the body and including a needle-embracing gland for receiving the discharge end of the needle with an interference fit and being adapted to be pierced by the needle when the body is collapsed to project the needle into a patient and discharge fluid, said method comprising:

(a) providing said ampoule in an empty assembled condition but with the diaphragm separable from the body by flexing the diaphragm at any point about its periphery to provide an opening through which the body may be filled with fluid;

(b) flexing the diaphragm to provide said opening as aforesaid;

(c) filling the body with fluid by feeding fluid thereto through said opening;

(d) engaging the diaphragm around its periphery with an annular sealing die and forcing it into intimate contact with the body around said open end thereof; and (e) heating contacting surfaces of the diaphragm and body entirely around their peripheries to effect fusion sealing of one to the other.

7. The method of filling and sealing a hypodermic ampoule comprising a cup-shaped, collapsible body having an endwall and an open opposite end, a hypodermic needle contained within the body with the butt end of the needle mounted on said endwall of the body in communication with the body interior and the discharge end of the needle directed outwardly, and a flexible and puncturable diaphragm closing said open end of the body and including a needle-embracing gland for receiving the discharge end of the needle with an interference fit and being adapted to be pierced by the needle when the body is collapsed to project the needle into a patient and discharge fluid, said method comprising:

(a) providing said ampoule in an empty, assembled condition but with the diaphragm separable from the body by flexing the diaphragm at any point about its periphery to provide an opening through which the body may be filled with fluid;

(b) flexing the diaphragm to provide said opening as aforesaid;

(c) filling the body with fluid by inserting a filling tube into said opening and metering a predetermined fluid charge into the body through said tube;

(d) separating said tube and ampoule to permit the diaphragm to return to its body-closing position;

(e) engaging the diaphragm around its periphery with an annular sealing die and forcing it into intimate contact with the body around said open end thereof; and (f) heating contacting surfaces of the diaphragm and body entirely around their peripheries to effect fusion sealing of one to the other.

8. The method of filling and sealing a hypodermic ampoule comprising a cup-shaped, collapsible body having an endwall and an open opposite end, a hypodermic needle contained within the body with the butt end of the needle mounted on said endwall of the body in communication with the body interior and the discharge end of the needle directed outwardly, and a flexible and puncturable diaphragm closing said open end of the body and including a needle-embracing gland for receiving the discharge end of the needle with an interference fit and being adapted to be pierced by the needle when the body is collapsed to project the needle into a patient and discharge fluid, said method comprising:

(a) providing said ampoule in an empty, assembled condition but with the diaphragm separable from the body by flexing the diaphragm at any point about its periphery to provide an opening through which the body may be filled with fluid;

(b) laterally restraining said gland while pushing a first portion of said diaphragm downwardly between said gland and the periphery of said diaphragm until a portion of the periphery of the diaphragm is flexed upwardly;

(c) lifting said diaphragm at the upwardly flexed portion of its periphery while maintaining the lateral restraint on said gland and relieving the downward pressure on said first portion of the diaphragm to provide said opening;

(d) filling the body with fluid by inserting a filling tube into said opening and metering a predetermined fluid charge into the body through said tube;

(e) separating said tube and ampoule to permit the diaphragm to return to its body-closing position;

(f) engaging the diaphragm about its periphery with an annular sealing die and forcing it into intimate contact with the body around said open end thereof; and (g) heating the contacting surfaces of the diaphragm and body entirely around their peripheries to effect fusion sealing of one to the other.

9. The method of filling and sealing a hypodermic ampoule comprising a cup-shaped, collapsible body having an endwall and an open opposite end, a hypodermic needle contained within the body with the butt end of the needle mounted on said endwall of the body in communication with the body interior and the discharge end of the needle directed outwardly, and a flexible and puncturable diaphragm closing said open end of the body and including a needle-embracing gland for receiving the discharge end of the needle with an interference fit and being adapted to be pierced by the needle when the body is collapsed to project the needle into a patient and discharge fluid, said method comprising:

(a) providing said ampoule in an empty, assembled condition but with the diaphragm separable from the body by flexing the diaphragm at any point about its periphery so as to provide an opening through which the body may be filled with fluid;

(b) laterally restraining said gland while pushing a first portion of said diaphragm downwardly between said gland and the periphery of said diaphragm until a portion of the periphery of the diaphragm is flexed upwardly;

(c) further lifting the upwardly flexed portion of said diaphragm while maintaining the lateral restraint on said gland and while relieving the downward pressure on said first portion of the diaphragm to provide said opening;

(d) moving said assembly along a fixed path while maintaining the opening between the diaphragm and the body;

(e) providing a filling tube on said fixed path and in alignment with said opening;

(f) stopping the movement of the ampoule assembly along said fixed path at a point thereon where the filling tube projects into said opening, and metering a predetermined fluid charge into the body through said tube;

(g) moving the filled body along said fixed path and from said filling tube and releasing the restraint on the diaphragm to permit the diaphragm to return to its body-closing position;

(h) engaging the diaphragm about its periphery with an annular sealing die and forcing it into intimate contact with the body around said open end thereof; and (i) heating contacting surfaces of the diaphragm and body entirely around their peripheries to effect fusion sealing of one to the other.

10. The method of assembling, filling, and sealing a hypodermic ampoule of the type comprising a cup-shaped, elastically collapsible body having an endwall and an open opposite end, a hypodermic needle contained within the body with the butt end of the needle mounted on said endwall of the body in communication with the body interior and the discharge end of the needle directed outwardly, and a flexible and puncturable diaphragm closing said open end of the body and including a needle-embracing gland for receiving the discharge end of the needle with an interference fit, said diaphragm being adapted to be pierced by the needle when the body is collapsed to project the needle into a patient and discharge said fluid, the assembly steps, while the body is empty, of:

(a) mounting the butt end of the needle on said endwall of the body;

(b) placing the diaphragm in its body-closing and needle-embracing position relative to the body and needle with the interference fit of the needle in the gland of the diaphragm holding the diaphragm in said position for subsequent sealing of the diaphragm to the body after the body has been filled;

(c) flexing the diaphragm to provide said opening as aforesaid;

(d) filling the body with fluid by feeding fluid thereto through said opening;

(e) engaging the diaphragm around its periphery with an annular sealing die and forcing it into intimate contact with the body around said open end thereof; and (f) heating contacting surfaces of the diaphragm and body entirely around their peripheries to effect fusion sealing of one to the other.

11. The method of assembling, filling, and sealing a hypodermic ampoule of the type comprising a cup-shaped, elastically collapsible body having an endwall and an open opposite end, a hypodermic needle contained within the body with the butt end of the needle mounted on said endwall of the body in communication with the body interior and the discharge end of the needle directed outwardly, and a flexible and puncturable diaphragm closing said open end of the body and including a needle-embracing gland for receiving the discharge end of the needle with an interference fit, said diaphragm being adapted to be pierced by the needle when the body is collapsed to project the needle into a patient and discharge said fluid, the assembly steps, while the body is empty, of:

(a) mounting the butt end of the needle on said endwall of the body;

(b) placing the diaphragm in its body-closing and needle-embracing position relative to the body and needle with the interference fit of the needle in the gland of the diaphragm holding the diaphragm in said position for subsequent sealing of the diaphragm to the body after the body has been filled;

(c) laterally restraining said gland while pushing a portion of said diaphragm downwardly between said gland and the periphery of said diaphragm until a first portion of the periphery of the diaphragm is flexed upwardly;

(d) lifting said diaphragm at its periphery while maintaining the lateral restraint on said gland and while relieving the downward pressure on said first portion of the diaphragm to provide said opening;

(e) filling the body with fluid by feeding fluid thereto through said opening;

(f) engaging the diaphragm around its periphery with an annular sealing die and forcing it into intimate contact with the body around said open end thereof; and (g) heating contacting surfaces of the diaphragm and body entirely around their peripheries to effect fusion sealing of one to the other.

12. The method of assembling, filling, and sealing a hypodermic ampoule of the type comprising a cup-shaped, elastically collapsible body having an endwall and an open opposite end, a hypodermic needle contained within the body with the butt end of the needle mounted on said endwall of the body in communication with the body interior and the discharge end of the needle directed outwardly, and a flexible and puncturable diaphragm closing said open end of the body and including a needle-embracing gland for receiving the discharge end of the needle with an interference fit, said diaphragm being adapted to be pierced by the needle when the body is collapsed to project the needle into a patient and discharge said fluid, the assembly steps, while the body is empty, of:

(a) mounting the butt end of the needle on said endwall of the body;

(b) placing the diaphragm in its body-closing and needle-embracing position relative to the body and needle with the interference fit of the needle in the gland of the diaphragm holding the diaphragm in said position for subsequent sealing of the diaphragm to the body after the body has been filled;

(c) laterally restraining said gland while pushing a first portion of said diaphragm downwardly between said gland and the periphery of said diaphragm until a portion of the periphery of the diaphragm is flexed upwardly;

(d) lifting said diaphragm at its periphery while maintaining the lateral restraint on said gland and while relieving the downward pressure on said first portion of the diaphragm to provide said opening;

(e) moving said assembly along a fixed path while maintaining the opening between the diaphragm and the body;

(f) providing a filling tube on said fixed path and in alignment with said opening;

(g) stopping the movement of the ampoule assembly along said fixed path so that an end of the filling tube projects into said opening, and metering a predetermined fluid charge into the body through said tube;

(h) moving the filled body along said fixed path and from said filling tube and releasing the restraint on the diaphragm to permit the diaphragm to return to its body-closing position;

(i) engaging the diaphragm around its periphery with an annular sealing die and forcing it into intimate contact with the body around said open end thereof; and (j) heating contacting surfaces of the diaphragm and body entirely around their peripheries to effect fusion sealing of one to the other.

13. The method of assembling, filling, and sealing a hypodermic ampoule of the type comprising a cup-shaped, elastically collapsible body having an endwall and an open opposite end, a hypodermic needle contained within the body with the butt end of the needle mounted on said endwall of the body in communication with the body interior and the discharge end of the needle directed outwardly, and a flexible and puncturable diaphragm closing said open end of the body and including a needle-embracing gland for receiving the discharge end of the needle with an interference fit, said diaphragm being adapted to be pierced by the needle when the body is collapsed to project the needle into a patient and discharge said fluid, the assembly steps, while the body is empty, of:

(a) mounting the butt end of the needle on said endwall of the body;

(b) placing the diaphragm in its body-closing and needle-embracing position relative to the body and needle with the interference fit of the needle in the gland of the diaphragm holding the diaphragm in said position for subsequent sealing of the diaphragm to the body after the body has been filled;

(c) flexing the diaphragm at a point about its periphery to provide an opening between the diaphragm and body through which the body may be filled with fluid;

(d) filling the body with fluid by inserting a filling tube into said opening and metering a predetermined fluid charge through said tube;

(e) separating said tube and ampoule to permit the diaphragm to return to its body-closing position;

(f) engaging the diaphragm around its periphery with an annular sealing die and forcing it into intimate contact with the body around said open end thereof; and (g) heating contacting surfaces of the diaphragm and body entirely around their peripheries to effect fusion sealing of one to the other.

14. The method of assembling, filling, and sealing a hypodermic ampoule of the type comprising a cup-shaped, elastically collapsible body having an endwall and an open opposite end, a hypodermic needle contained within the body with the butt end of the needle mounted on said endwall of the body in communication with the body interior and the discharge end of the needle directed outwardly, and a flexible and puncturable diaphragm closing said open end of the body and including a needle-embracing gland for receiving the discharge end of the needle with an interference fit, said diaphragm being adapted to be pierced by the needle when the body is collapsed to project the needle into a patient and discharge said fluid, the assembly steps, while the body is empty, of:

(a) mounting the butt end of the needle on said endwall of the body;

(b) placing the diaphragm in its body-closing and needle-embracing position relative to the body and needle with the interference fit of the needle in the gland of the diaphragm holding the diaphragm in said position for subsequent sealing of the diaphragm to the body after the body has been filled;

(c) laterally restraining said gland while pushing a first portion of said diaphragm downwardly between said gland and the periphery of said diaphragm until a portion of the periphery of the diaphragm is flexed upwardly;

(d) lifting said diaphragm at its periphery while maintaining the lateral restraint on said gland and while relieving the downward pressure on said first portion of the diaphragm to provide said opening;

(e) filling the body with fluid by inserting a filling tube into said opening and metering a predetermined fluid charge through said tube;

(f) separating said tube and ampoule to permit the diaphragm to return to its body-closing position;

(g) engaging the diaphragm around its periphery with an annular sealing die and forcing it into intimate contact with the body around said open end thereof; and (h) heating contacting surfaces of the diaphragm and body entirely around their peripheries to effect fusion sealing of one to the other.

15. The method of assembling, filling, and sealing a hypodermic ampoule of the type comprising a cup-shaped, elastically collapsible body having an endwall and an open opposite end, a hypodermic needle contained within the body with the butt end of the needle mounted on said endwall of the body in communication with the body interior and the discharge end of the needle directed outwardly, and a flexible and puncturable diaphragm closing said open end of the body and including a needle-embracing gland for receiving the discharge end of the needle with an interference fit, said diaphragm being adapted to be pierced by the needle when the body is collapsed to project the needle into a patient and discharge said fluid, the assembly steps, while the body is empty, of:

(a) mounting the butt end of the needle on said endwall of the body;

(b) placing the diaphragm in its body-closing and needle-embracing position relative to the body and needle with the interference fit of the needle in the gland of the diaphragm holding the diaphragm in said position for subsequent sealing of the diaphragm to the body after the body has been filled;

(c) laterally restraining said gland while pushing a first portion of said diaphragm downwardly between said gland and the periphery of said diaphragm until a portion of the periphery of the diaphragm is flexed upwardly;

(d) lifting said diaphragm at its periphery while maintaining the lateral restraint on said gland and while relieving the downward pressure on said first portion of the diaphragm to provide said opening;

(e) moving said assembly along a fixed path while maintaining the opening between the diaphragm and the body;

(f) providing a filling tube on said fixed path and in alignment with said opening;

(g) stopping the movement of the ampoule assembly along said fixed path so that an end of the filling tube projects into said opening, and metering a predetermined fluid charge into the body through said tube;

(h) moving the filled body along said fixed path and from said filling tube and releasing the restraint on the diaphragm to permit the diaphragm to return to its body-closing position;

(i) engaging the diaphragm around its periphery with an annular sealing die and forcing it into intimate contact with the body around said open end thereof; and (j) heating contacting surfaces of the diaphragm and body entirely around their peripheries to effect fusion sealing of one to the other.

16. Apparatus for assembling, prior to filling with fluid, a hypodermic ampoule of the type comprising a cup-shaped, elastically collapsible body having an endwall and an open opposite end, a hypodermic needle contained within the body with the butt end of the needle mounted on said endwall of the body in communication with the body interior and the discharge end of the needle directed outwardly, and a flexible and puncturable diaphragm closing said open end of the body and including a needle-embracing gland for receiving the discharge end of the needle with an interference fit, said diaphragm being adapted to be pierced by the needle when the body is collapsed to project the needle into a patient and discharge said fluid, said apparatus comprising:

(a) means for mounting the butt end of the needle on said endwall of the body; and (b) means for placing the diaphragm in its body-closing and needle-embracing position with the interference fit of the needle in the gland of the diaphragm holding the diaphragm in said position for subsequent sealing of the diaphragm to the body after the body has been filled.

17. Apparatus for assembling, prior to filling with fluid, a hypodermic ampoule of the type comprising a cup-shaped, elastically collapsible body having an endwall and an open opposite end, a hypodermic needle contained within the body with the butt end of the needle mounted on said endwall of the body in communication with the body interior and the discharge end of the needle directed outwardly, and a flexible and puncturable diaphragm closing said open end of the body and including a needle-embracing gland for receiving the discharge end of the needle with an interference fit, said diaphragm being adapted to be pierced by the needle when the body is collapsed to project the needle into a patient and discharge said fluid, said apparatus comprising:

(a) means for mounting the butt end of the needle on said endwall of the body so as to resist separation thereof; and (b) means for placing the diaphragm in its body-closing and needle-embracing position relative to the body and needle with the interference fit of the needle in the gland of the diaphragm holding the diaphragm in said position for subsequent sealing of the diaphragm to the body after the body has been filled, but with the diaphragm separable from the body by flexing of the diaphragm at any point about its periphery to provide an opening through which the body may be filled with fluid.

18. Apparatus for assembling, prior to filling with fluid, a hypodermic ampoule of the type comprising a cup-shaped, elastically collapsible body having an endwall and an open opposite end, a hypodermic needle contained within the body with the butt end of the needle mounted on said endwall of the body in communication with the body interior and the discharge end of the needle directed outwardly, and a flexible and puncturable diaphragm closing said open end of the body and including a needle-embracing gland for receiving the discharge end of the needle with an interference fit, said diaphragm being adapted to be pierced by the needle when the body is collapsed to project the needle into a patient and discharge said fluid, said apparatus comprising:

(a) means for turning the body at least partially inside-out to project the inner surface of its endwall through said open end of the body;

(b) means for mounting the butt end of the needle on the inner surface of said endwall of the body so as to resist separation thereof while said endwall is projecting outwardly as aforesaid;

(c) means for placing the diaphragm in its needle-embracing position with the interference fit of the needle in the gland of the diaphragm holding the diaphragm in said position; and (d) means for returning the body to a right-side-out condition to draw the needle into the body in normal assembled relationship therewith and move the diaphragm into its normal body-closing position for subsequent sealing of the diaphragm to the body after the body has been filled, but with the diaphragm separable from the body by flexing of the diaphragm at any point about its periphery to provide an opening through which the body may be filled with fluid.

19. Apparatus for filling and sealing a hypodermic ampoule comprising a cup-shaped collapsible body having an endwall and an opposite end, a hypodermic needle contained within the body with the butt end of the needle mounted on said endwall of the body in communication with the body interior and the discharge end of the needle directed outwardly, and a flexible and puncturable diaphragm closing said open end of the body and including a needle-embracing gland for receiving the discharge end of the needle with an interference fit and being adapted to be pierced by the needle when the body is collapsed to project the needle into a patient and discharge fluid, said apparatus comprising:

(a) means for supporting said ampoule in an empty, assembled condition but with the diaphragm separable from the body by flexing the diaphragm at any point about its periphery to provide an opening through which the body may be filled with fluid;

(b) means for flexing the diaphragm to provide said opening as aforesaid;

(c) means for filling the body with fluid through said opening;

(d) means for engaging the diaphragm around its periphery with an annular sealing die for forcing a peripheral portion of the diaphragm into intimate contact with the body around said open end thereof; and (e) means for heating contacting surfaces of the diaphragm and body entirely around their peripheries to effect fusion sealing of one to the other.

20. Apparatus for filling and sealing a hypodermic ampoule comprising a cup-shaped, collapsible body having an endwall and an open opposite end, a hypodermic needle contained within the body with the butt end of the needle mounted on said endwall of the body in communication with the body interior and the discharge end of the needle directed outwardly, and a flexible and puncturable diaphragm closing said open end of the body and including a needle-embracing gland for receiving the discharge end of the needle with an interference fit and being adapted to be pierced by the needle when the body is collapsed to project the needle into a patient and discharge fluid, said apparatus comprising:

(a) means for supporting said ampoule in an empty, assembled condition but with the diaphragm separable from the body by flexing the diaphragm at any point about its periphery to provide an opening through which the body may be filled with fluid;

(b) means for flexing the diaphragm to provide said opening as aforesaid;

(c) means for filling the body with fluid, said filling means comprising a filling tube for metering a predetermined fluid charge into said opening in the body;

(d) means for separating said tube and ampoule to permit the diaphragm to return to its body-closing position;

(e) means for engaging the diaphragm around its periphery with an annular sealing die and forcing a peripheral portion of the diaphragm into intimate contact with the body around said open end thereof; and (f) means for heating contacting surfaces of the diaphragm and body entirely around their peripheries to effect fusion sealing of one to the other.

21. Apparatus for assembling, filling, and sealing a hypodermic needle of the type comprising a cup-shaped, elastically collapsible body having an endwall and an open opposite end, a hypodermic needle contained within the body with the butt end of the needle mounted on said endwall of the body in communication with the body interior and the discharge end of the needle directed outwardly, and a flexible and puncturable diaphragm closing said open end of the body and including a needle-embracing gland for receiving the discharge end of the needle with an interference fit, said diaphragm being adapted to be pierced by the needle when the body is collapsed to project the needle into a patient and discharge said fluid, said apparatus comprising:

(a) means for mounting the butt end of the needle on said endwall of the body;

(b) means for placing the diaphragm in its body-closing and needle-embracing position relative to the body and needle with the interference fit of the needle in the gland of the diaphragm holding the diaphragm in said position for subsequent sealing of the diaphragm to the body after the body has been filled;

(c) means for flexing the diaphragm to provide said opening as aforesaid;

(d) means for filling the body with fluid through said opening;
(e) means for engaging the diaphragm around its periphery with an annular sealing die and forcing a peripheral portion of the diaphragm into intimate contact with the body around said open end thereof; and
(f) means for heating contacting surfaces of the diaphragm and body entirely around their peripheries to effect fusion sealing of one to the other.

References Cited
UNITED STATES PATENTS

| | | | |
|---|---|---|---|
| 2,696,212 | 12/1954 | Dunmire | 128—216 |
| 3,094,121 | 6/1963 | Blumenstein et al. | 128—218.1 |
| 3,173,200 | 4/1965 | Dunmire et al. | 29—414 |

TRAVIS S. McGEHEE, *Primary Examiner.*

ROBERT L. FARRIS, *Assistant Examiner.*

U.S. Cl. X.R.

53—282; 29—208, 453

UNITED STATES PATENT OFFICE
CERTIFICATE OF CORRECTION

January 21, 1969

Patent No. 3,422,594

Alfred A. Hurschman

It is certified that error appears in the above identified patent and that said Letters Patent are hereby corrected as shown below:

Column 4, line 39, "witheout" should read -- without --; line 44, "permititng" should read -- permitting --; line 50, "aparent" should read -- apparent --. Column 10, line 3, after "when the" insert -- ampoule 10 is completely assembled, and the --. Column 13, line 64, "FIG. 31" should read -- FIG. 21 --.

Signed and sealed this 17th day of March 1970.

(SEAL)

Attest:

Edward M. Fletcher, Jr.

Attesting Officer

WILLIAM E. SCHUYLER, JR.

Commissioner of Patents